United States Patent
George

(10) Patent No.: US 8,180,280 B2
(45) Date of Patent: May 15, 2012

(54) TECHNIQUES FOR TRACKING DESTINATIONS ON A MOBILE COMPUTING DEVICE

(75) Inventor: Moses George, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 928 days.

(21) Appl. No.: 12/144,779

(22) Filed: Jun. 24, 2008

(65) Prior Publication Data

US 2009/0318163 A1    Dec. 24, 2009

(51) Int. Cl.
*H04B 7/15*    (2006.01)
(52) U.S. Cl. .................. 455/11.1; 340/457; 340/539.13
(58) Field of Classification Search .................. 340/457, 340/539.13; 701/201; 455/11.1
See application file for complete search history.

(56) References Cited

U.S. PATENT DOCUMENTS

| 6,259,362 | B1 * | 7/2001 | Lin ............................... 340/457 |
| 6,321,158 | B1 * | 11/2001 | DeLorme et al. ............. 701/201 |
| 7,068,163 | B2 * | 6/2006 | Sari et al. ................. 340/539.13 |

* cited by examiner

*Primary Examiner* — William D Cumming

(57) ABSTRACT

Systems and techniques for tracking destinations on a mobile computing device are described. A mobile computing device may comprise or implement hardware or software configured to determine arrival at a destination and what is situated at the destination. A vehicle based communication device may communicate with the mobile computing device by way of a short range wireless communication system. The mobile computing device or the vehicle based communication device may establish a location-based service (LBS) communications session and store a description of a location associated with the destination when the mobile computing device and the vehicle based communication device reach the destination.

16 Claims, 6 Drawing Sheets

TECHNIQUES FOR TRACKING DESTINATIONS ON A MOBILE COMPUTING DEVICE

BACKGROUND

A mobile computing device such as a combination handheld computer and mobile telephone or smart phone generally may provide voice and data communications functionality, as well as computing and processing capabilities. A mobile computing device also may provide position determination capabilities to allow a user to receive a variety of location-based services (LBS) according to the current position of the mobile computing device.

To provide location based information, a mobile computing device may employ a global positioning service. When traveling, a mobile computing device may also communicate with a vehicle by way of a short range wireless communication system, such as a Bluetooth® communication system. To determine destinations to which the mobile computing device has traveled, however, there may be a need for techniques to provide location-based services to a mobile computing device whereby the mobile computing device logs destinations reached.

DETAILED DESCRIPTION

Various embodiments are directed to systems and techniques for providing location-based services (LBS) to a mobile computing device having a location determination capability. In one or more embodiments, the mobile computing device may comprise or implement hardware and/or software configured to enable storage of destinations and access to those stored destinations.

Figure 1:
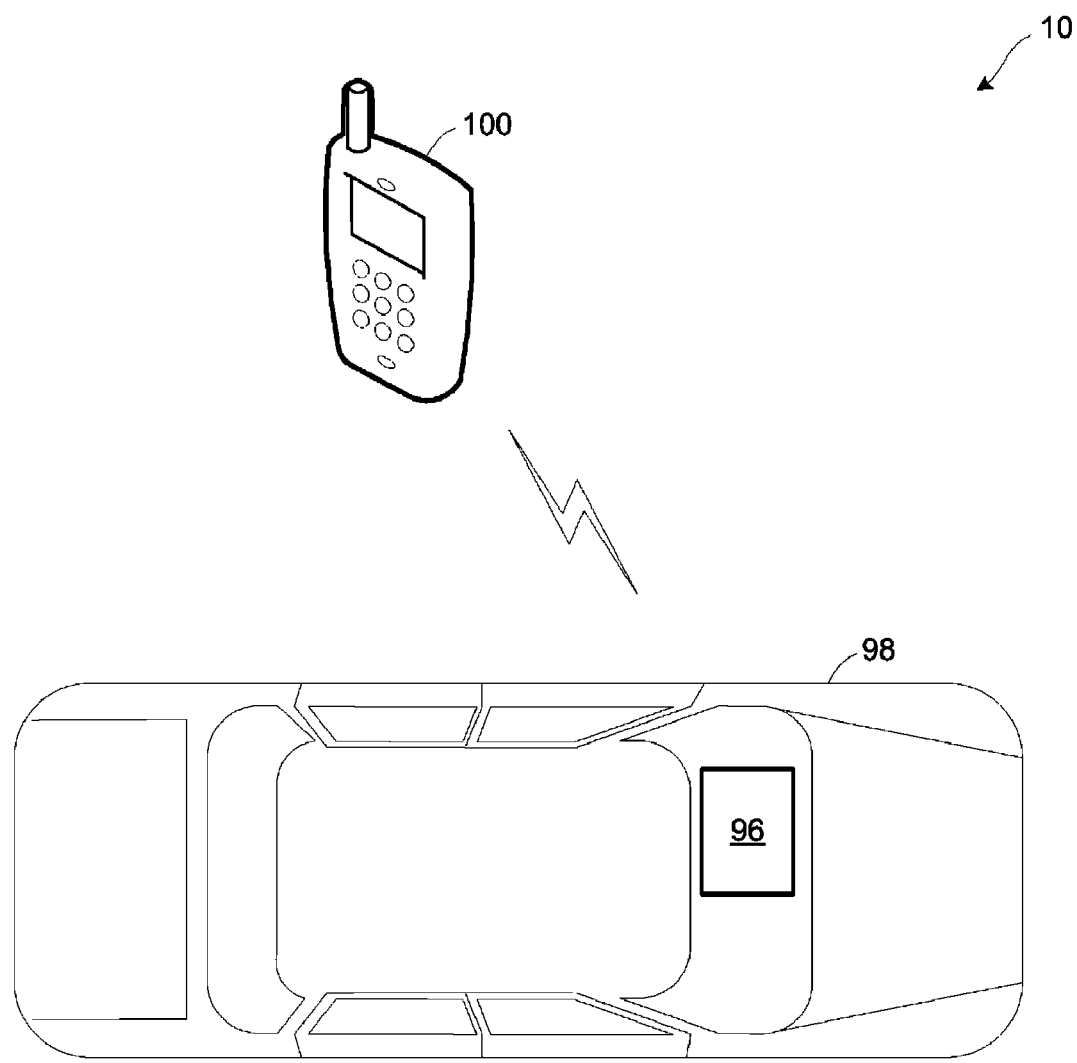
FIG. 1 illustrates a destination cataloguing system in accordance with one or more embodiments of destination tracking.

FIG. 1 illustrates a destination cataloguing system 10 in accordance with one or more embodiments. The destination cataloguing system 10 illustrated in FIG. 1 incorporates a mobile computing device 100 and a vehicle 98 based communication device 96. In embodiments, the vehicle 98 based communication device 96 may comprise a hands free type device that permits use of a mobile computing device 100 in hands free mode in the vehicle 98.

The destination cataloguing system 10 provides a listing of places where the vehicle 14 has stopped in a destination database 180. Determination of when a destination has been reached may be performed by one of the mobile computing device 100 or the vehicle 98 based communication device 96 based on communication between the devices 100, 104. Communication between the mobile computing device 100 and the vehicle 98 based communication device 96 may be by way of a short range wireless communication system. A position determination technique may be implemented on either the mobile computing device 100 or the vehicle 98 based communication device 96.

Arrival at a destination that is to be stored may be established in any way desired. In one embodiment, for example, a technique to determine destination arrival may include monitoring for interruptions in communications activities between the mobile computing device 100 and the vehicle 98 based communication device 96. In one embodiment, for example, a technique to determine destination arrival may include monitoring for time periods when the mobile computing device 100 and the vehicle 98 are stationary. Other destination arrival techniques may be used in addition to these two examples, and the embodiments are not limited in this context.

In one embodiment, arrival at a destination may be indicated when communication between the mobile computing device 100 and the vehicle 98 based communication device 96 is broken, ceases or is otherwise discontinued. This may indicate that the vehicle 98 has stopped, and an occupant of the vehicle has exited the vehicle 98 and removed the mobile computing device 100 from the vehicle 98, presumably to enter a destination. When communication activity ceases, the current location may be stored as a destination.

In one embodiment, arrival at a destination may be indicated when the vehicle 98 remains at a certain location for a predetermined period of time. The mobile computing device 100 may have motion detection capabilities. Motion detection is the action of sensing physical movement in a given area. Motion can be detected by measuring change in speed or vector of an object, which in this case includes the mobile computing device 100 and/or the vehicle 98. This can be achieved either by mechanical devices that physically interact with the field or by electronic devices that quantifies and measures changes in the given environment. Vehicle motion may be sensed in any way desired including, for example, when a change in location is sensed by GPS, by ultrasonic, microwave, or optical motion sensing or by accelerometer.

In one embodiment, the mobile computing device 100 may use a motion detector to detect when the vehicle 98 is not in motion. The mobile computing device 100 may implement a timer to measure an amount of time the vehicle 98 is not in motion. The measured time may be compared to a predetermined threshold to determine whether to indicate arrival at a destination. The predetermined threshold may be configurable, but is typically longer than an average time period allocated for routine stops by a vehicle, such as a traffic signal or a gas station. When the mobile computing device 100 and the vehicle 98 are stationary for a determined period of time, the current location may be stored as a destination. This embodiment may be advantageous in those cases where an occupant of the vehicle has exited the vehicle 98 but did not remove the mobile computing device 100 from the vehicle 98.

In embodiments, the destination cataloguing system 10 determines the location of the vehicle 98 based communication device 96 or mobile computing device 100 when communication is broken between the mobile computing device 100 and the vehicle 98 based communication device 96. The destination cataloguing system 10 references a map database 150 when the mobile computing device 100 is no longer communicating with the vehicle 98 based communication device 96 to determine what is situated at the location where communication was broken. Either the mobile computing device 100 or the vehicle 98 based communication device 96 may then log the location in a destination database 180.

In embodiments where the vehicle 98 based communication device 96 senses vehicle 98 operation, the vehicle 98 based communication device 96 may determine that a location has been reached when the engine is de-energized. Arrival at a destination may alternately be determined when a key is removed from an ignition of the vehicle 98 and such information is available to the vehicle 98 based communication device 96. Arrival at a destination may alternately be determined when a wireless key is moved from the proximity of the vehicle 98 and that information is available to the vehicle 98 based communication device 96.

The destination cataloguing system 10 may access the map database 150 to determine what, if anything, is located at the destination once the vehicle 104 has arrived at a destination. The destination database 180 may, for example, include the owner of the property situated at the destination and/or may include a description of a structure situated at the destination, such as, for example, a private dwelling or a commercial establishment. In an embodiment, the destination database 180 identifies a commercial establishment situated at the destination, such as a store, a restaurant, a hotel, a campground, a landmark, an entertainment venue, an amusement park, an airport, a church, or a parking lot, for example. In an embodiment, the destination database 180 identifies a street address of the destination. In an embodiment, the destination database 180 identifies a position of the destination on a road. In an embodiment, the destination database 180 identifies a longitude and latitude of the destination. The destination database 180 may identify a destination based on any indication of what is situated at that location or any identification of the location.

The map database 150 may be stored in either the mobile computing device 100 or vehicle 98 based communication device 96 or may be stored remotely and accessed by the mobile computing device 100 or the vehicle 98 based communication device 96. In embodiments, the map database 150 may be stored in a wireless service carrier server and accessed through the wireless service carrier or the map database 150 may be stored in a third party server accessed, for example, over the Internet.

The destination database 180 may be stored on the mobile computing device 100, on the vehicle 98 based communication device 96, or remotely on a server, such as a wireless service carrier server for access by the mobile computing device 100 or vehicle 98 based communication device 96.

The mobile computing device 100 or vehicle 98 based communication device 96 may include time and/or date functions that permit the mobile computing device 100 or vehicle 98 based communication device 96 to access the date and/or time of arrival at, and/or departure from, the destination. The mobile computing device 100 or vehicle 98 based communication device 96 may also be capable of storing the date and/or time of arrival at and/or the date and/or time of departure from the destination in the destination database 180. For example, in an embodiment, arrival at a destination is determined by a loss of communication between the mobile computing device 100 and the vehicle 98 based communication device 96 or otherwise as desired. The date and time when that communication is lost, for example, may then be selected as the date and time of arrival at the destination. That date and or time of arrival may then be stored in the map database 150 along with the destination.

Departure from the destination may be determined by resumption of communication between the mobile computing device 100 and the vehicle 98 based communication device 96 or as desired. The date and time when that communication is resumed, for example, may then be selected as the time of departure from the destination. That date and or time of departure may then be stored in the map database 150 along with the destination.

The destination database 180 may store additional information with the destination as desired. For example, in embodiments, the date of arrival at the destination, the time of arrival at the destination, the date of departure from the destination, the time of departure from the destination, a range of dates and/or times spent at the destination, and/or a length of time spent at the destination may be stored with or otherwise associated with the destination.

In an embodiment, the destination database 180 stores the destinations visited in chronological order. In an embodiment, the destination database 180 may be accessed by the user through the mobile computing device 100 or the vehicle 98 based communication device 96. Access to the destination database 180 may be performed in ways known to those familiar with databases, such as, for example, having the locations sorted in chronological order, reverse chronological order, by proximity to one another, or by proximity to a current location of the destination cataloguing system 10. In embodiments the destination database 180 may be accessible by date such that all destinations visited on a selected day would be displayed upon request. In embodiments, the destination database 180 may be accessed by time so that a destination visited at that time would be displayed upon request. In embodiments, the destination database 180 may be accessed by a range of dates or times so that any destination visited in the range would be accessed. Various access options may also be available for accessing the destination database 180

In various embodiments the accessed destinations may be displayed as desired including, for example, as a list or on a map. In an embodiment wherein destinations are displayed on a map, the mapped area may be selected as desired, such as, for example, by centering the map on the current location of the mobile computing device 100 or vehicle 98 based communication device 96 and zooming in or out to acquire the desired area. In map display embodiments a desired area may be bounded and destinations visited in that area may be displayed. In map display embodiments a map center point may be selected and destinations in the vicinity of the center point may be displayed.

In display embodiments where limited information regarding the destinations can be displayed on the map, additional information regarding a destination displayed on the map may be accessed by, for example, selecting the desired destination. Additional information may then be displayed for the selected destination as desired. In embodiments, that additional information may be displayed in a listing separate from the map.

The destination database 180 may be accessed by vicinity in various ways. For example, in an embodiment a mobile computing device 100 user could access a map, display the map on the screen of the mobile computing device 100, and size the map so that it is bounded on the screen to define an area of interest. The map may, in response, display all destinations in the destination database 180 that are situated in the area bounded on the map. Furthermore, in certain embodiments, combinations of attributes, such as a time visited range and area boundaries may be combined in a search of destinations visited.

Figure 2:
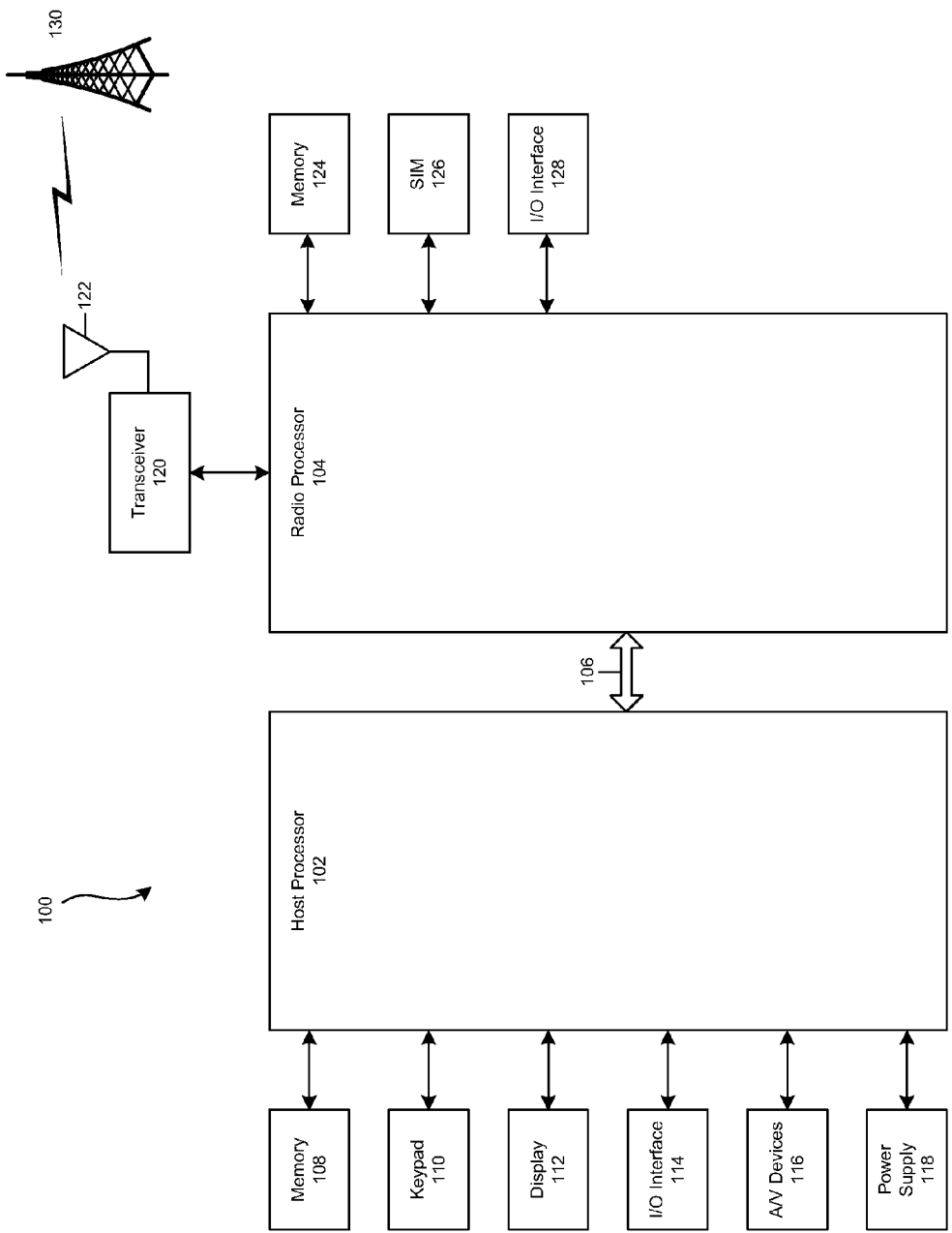
FIG. 2 illustrates a mobile computing device in accordance with one or more embodiments of destination tracking.

FIG. 2 illustrates a mobile computing device 100 in accordance with one or more embodiments. Although various elements and functions of the mobile computing device 100 may not be described in detail, it is to be understood that the mobile computing device 100 may implement any element or function described herein which is consistent with the described embodiments.

The mobile computing device 100 may comprise a single processor architecture or a dual processor architecture including a host processor 102 and a radio processor 104. The single processor or the host processor 102 and the radio processor 104 may enable the mobile computing device 100 to provide position determination capabilities to allow a user to receive a variety of location-based services (LBS) according to the current position of the mobile computing device 100.

The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth.

In addition to voice communications functionality, the mobile computing device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of short range wireless systems, such as a wireless personal area network (PAN) system. One example of a suitable short range wireless communication system offering data communication services may include a Bluetooth system operating in accordance with the Bluetooth Special Interest Group (SIG) series of protocols, including Bluetooth Specification versions v10, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As previously stated, the mobile computing device 100 may be configured in various ways and may use a single processor or more than one processor. For example, as shown in the embodiment of FIG. 2, the mobile computing device 100 may comprise a dual processor architecture including a host processor 102 and a radio processor 104. The host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for the mobile computing device 100. The radio processor 104 may be responsible for performing various voice and data communications operations for the mobile computing device 100 such as transmitting and receiving voice and data information over one or more wireless communications channels. Although embodiments of the dual processor architecture may be described as comprising the host processor 102 and the radio processor 104 for purposes of illustration, it is worthy to note that the dual processor architecture of the mobile computing device 100 may comprise additional processors.

In various embodiments, the host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

The host processor 102 may be arranged to provide processing or computing resources to the mobile computing device 100. For example, the host processor 102 may be responsible for executing various software programs such as application programs and system programs to provide computing and processing operations for the mobile computing device 100. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between the mobile computing device 100 and a user.

System programs assists in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Runtime Environment for Wireless (BREW) OS, JavaOS, a Wireless Application Protocol (WAP) OS, and so forth.

The mobile computing device 100 may comprise a memory 108 coupled to the host processor 102. In various embodiments, the memory 108 may be arranged to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

Although the memory 108 may be shown as being separate from the host processor 102 for purposes of illustration, it is worthy to note that in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The mobile computing device 100 may comprise an alphanumeric keypad 110 coupled to the host processor 102. The keypad 110 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The host processor 102 may be coupled to a display 112. The display 112 may comprise any suitable visual interface for displaying content to a user of the mobile computing device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an input/output (I/O) interface 114 coupled to the host processor 102. The I/O interface 114 may comprise one or more I/O devices such as a serial connection port, an infrared port, short range wireless communication protocol, such as integrated Bluetooth® wireless capability, and/or integrated 802.11x (WiFi) wireless capability, to enable wired (e.g., USB cable) and/or wireless connection to a local computer system, such as a local personal computer (PC) or a vehicle 98 based communication device 96. In various implementations, mobile computing device 100 may be arranged to transfer and/or synchronize information with the local computer system or the vehicle 98 based communication device 96.

The host processor 102 may be coupled to various audio/video (A/V) devices 116 that support A/V capability of the mobile computing device 100. Examples of A/V devices 114 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 arranged to supply and manage power to the elements of the mobile computing device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

The mobile computing device 100 may comprise a transceiver module 120 coupled to the radio processor 104. The transceiver module 120 may comprise one or more transceivers arranged to communicate using different types of protocols, communication ranges, operating power requirements, RF sub-bands, information types (e.g., voice or data), use scenarios, applications, and so forth. In various embodiments, the transceiver module 120 may comprise one or more transceivers arranged to support voice communication for a cellular radiotelephone system such as a GSM, UMTS, and/or CDMA system. The transceiver module 120 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, it is worthy to note that in various embodiments some portion or the entire transceiver module 120 may be included on the same integrated circuit as the radio processor 104. The embodiments are not limited in this context.

The mobile computing device 100 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

The mobile computing device 100 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, and so forth. The memory 124 may comprise, for example, flash memory and secure digital (SD) RAM. Although the memory 124 may be shown as being separate from and external to the radio processor 104 for purposes of illustration, it is worthy to note that in various embodiments some portion or the entire memory 124 may be included on the same integrated circuit as the radio processor 104.

The mobile computing device 100 may comprise a subscriber identity module (SIM) 126 coupled to the radio processor 104. The SIM 126 may comprise, for example, a removable or non-removable smart card arranged to encrypt voice and data transmissions and to store user-specific data for allowing a voice or data communications network to identify and authenticate the user. The SIM 126 also may store data such as personal settings specific to the user.

The mobile computing device 100 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between the mobile computing device 100 and one or more external computer systems.

In various embodiments, the mobile computing device 100 may comprise position determination capabilities. The mobile computing device 100 may employ one or more position determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

The mobile computing device 100 may be arranged to operate in one or more position determination modes including, for example, a standalone mode, a mobile station (MS) assisted mode, and/or a MS-based mode. In a standalone mode, such as a standalone GPS mode, the mobile computing device 100 may be arranged to autonomously determine its position without network interaction or support. When operating in an MS-assisted mode or an MS-based mode, however, the mobile computing device 100 may be arranged communicate over a radio access network 130 (e.g., UMTS radio access network) with a position determination entity (PDE) 132 such as a location proxy server (LPS) and/or a mobile positioning center (MPC).

In an MS-assisted mode, such as an MS-assisted AGPS mode, the PDE 132 may be arranged to determine the position of the mobile computing device. In an MS-based mode, such as an MS-based AGPS mode, the mobile computing device 100 may be arranged to determine its position with only limited periodic assistance from the PDE 132. In various implementations, the mobile computing device 100 and the PDE 132 may be arranged to communicate according a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting the mobile computer device 100, the PDE 132 may handle various processing operations and also may provide information to aid position determination. Examples of assisting information may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, and so forth.

In various implementations, the assisting information provided by the PDE 132 may improve the speed of satellite acquisition and the probability of a position fix by concentrating the search for a GPS signal and/or may improve the accuracy of position determination. Each position fix or series of position fixes may be available at the mobile computing device 100 and/or at the PDE 132 depending on the position determination mode. In some cases, data calls may be made and assisting information may be sent to the mobile computing device 100 from the PDE 132 for every position fix. In other cases, data calls may be made and assistance information may be sent periodically and/or as needed.

In various embodiments, the mobile computing device 100 may comprise dedicated hardware circuits or structures, or a combination of dedicated hardware and associated software, to support position determination. For example, the transceiver module 120 and the antenna system 122 may comprise GPS receiver or transceiver hardware and one or more associated antennas coupled to the radio processor 104 to support position determination.

Figure 3:
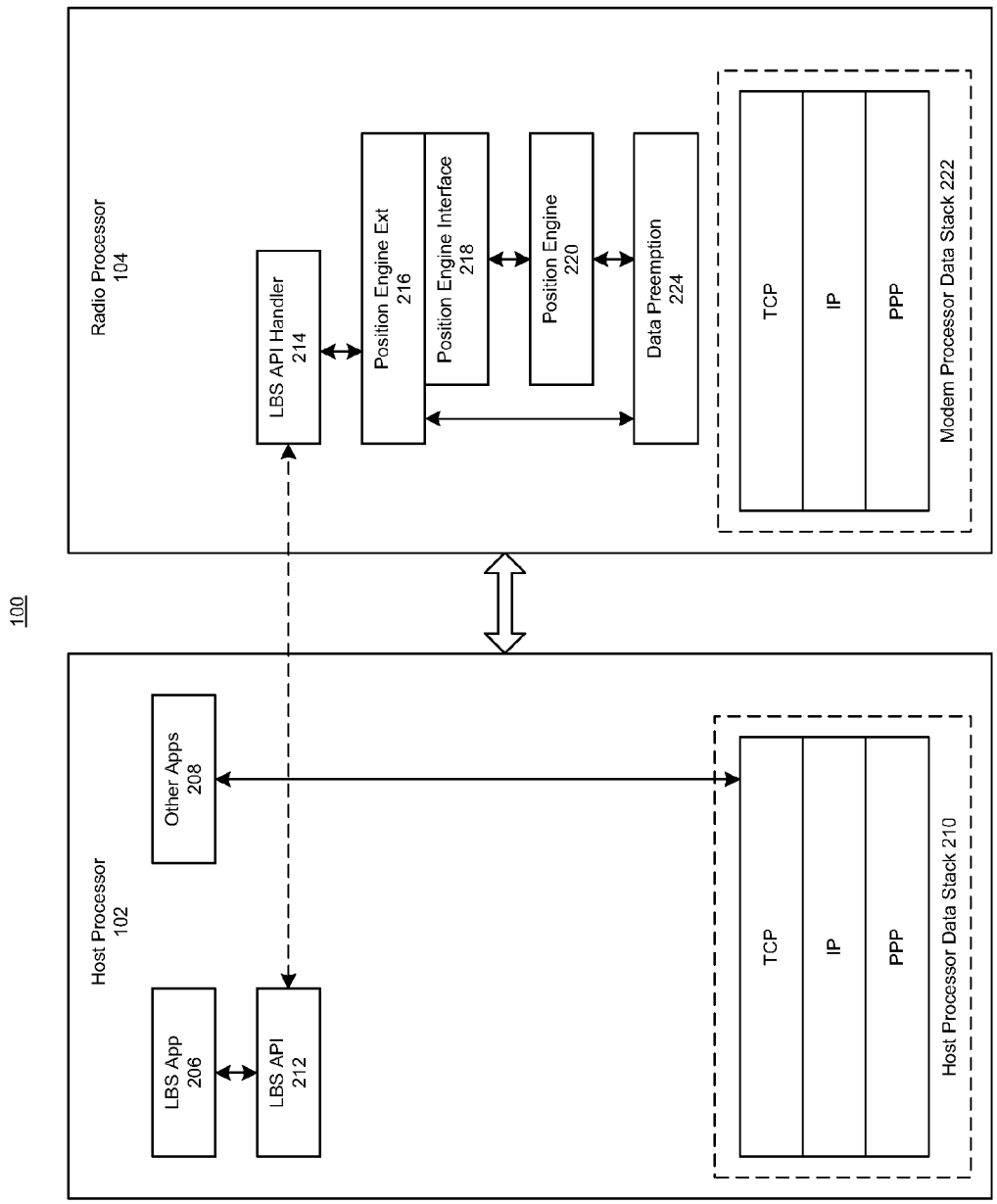
FIG. 3 illustrates a mobile computing device in accordance with one or more embodiments of destination tracking.

FIG. 3 illustrates the mobile computing device 100 in accordance with one or more embodiments. As has been previously stated, the mobile computing device 100 may comprise a single processor architecture or a dual processor architecture including a host processor 102 and a radio processor 104. An embodiment of a dual processor architecture is illustrated in FIG. 3. In such an embodiment, the host processor 102 and the radio processor 104 may enable the mobile computing device 100 to provide position determination capabilities to allow a user to receive a variety of location-based services (LBS) according to the current position of the mobile computing device 100.

The host processor 102 may comprise and/or implement at least one LBS application 206. In general, the LBS application 206 may comprise any type of client application executed by the host processor 102, such as a GPS application, arranged to communicate location requests and location responses. Examples of LBS include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application 206 may be arranged to send a location request in response to receiving input from the mobile computing device 100 or from a source external to the mobile computing device 100. For example, the user of the mobile computing device 100 may interact with a data input device to command the LBS application 206 to send a location request. The LBS application 206 also may send a location request in response to receiving input from an external network element or computing device that is attempting to locate the user of the mobile computing device 100. For example, in embodiments the mobile computing device 100 may respond to a location request sent by the vehicle 98 based communication device 96. In some cases, the LBS application 206 also may be arranged to automatically, periodically, and/or autonomously send location requests. For example, in an embodiment the mobile computing device 100 sends a location request when the mobile computing device 100 ceases to communicate with the vehicle 98 based communication device 96.

As shown in FIG. 2, the host processor 102 also may comprise and/or implement one or more other applications 208 in addition to the LBS application 206. In general, the other applications 208 may comprise any type of client application executed by the host processor 102 that operates without regard to the location of the mobile computing device 100. The other applications 208 may comprise, for example, one or more messaging applications (e.g., telephone, voicemail, e-mail, IM, SMS, MMS), a web browser application, personal management applications (e.g., PIM, contacts, calendar, scheduling, tasks), word processing applications, spreadsheet applications, database applications, media applications (e.g., video player, audio player, multimedia player, digital camera, video camera, media management), gaming applications, and so forth.

Although the other applications 208 may operate without regard to the location of the mobile computing device 100, it can be appreciated that in various embodiments, the LBS application 206 may request and receive position information to enhance the functionality of one or more of the other applications 208. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place. The embodiments are not limited in this context.

The host processor 102 may comprise or implement a data stack 210 including a set of lower layers including, for example, a transport layer such as a Transmission Control Protocol (TCP) layer, a network layer such as an Internet Protocol (IP) layer, and a link layer such as a Point-to-Point (PPP) layer. Together with the application layer, the data stack 210 may comprise a software implementation of a computer networking protocol suite defining various protocols (e.g., TCP/IP/PPP protocols) that support data communications. In various embodiments, upper layer programs may communicate using the data stack 210 through a data socket interface such as a Microsoft® Windows® Sockets (Winsock) interface that enables upper layer programs to access network services using the data stack 210.

The host processor 102 may comprise or implement an LBS API 212, such as a GPS API, coupled to the LBS application 206. In various embodiments, the LBS API 212 may be arranged to allow communication of location requests and location responses between the LBS application 206 and one or more position determination programs implemented on the radio processor 104. In such embodiments, the LBS API 212 may comprise a remote API with respect to the radio processor 104 which allows the LBS application 206 running on the data stack 210 of the host processor 102 to access one or more position determination programs running on the radio processor 104.

The LBS API 212 may comprise an interface to an LBS API handler 214 (e.g., GPS API handler) implemented on the radio processor 104. The LBS API handler 214 may be arranged to provide connectivity between the LBS API 212 and one or more position determination programs implemented on the radio processor 104 such as a position engine extension 216, a position engine interface 218 and a position engine 220 for allowing the exchange of location requests and location responses. In various implementations, the LBS API handler 214 may be configured to forward location requests received from the LBS application 206 through the LBS API 212 to one or more of the position engine extension 216, the position engine interface 218, and the position engine 220.

The radio processor 104 may comprise or implement a position engine extension 216 such as a PDE (e.g., LPS and/or MPC) extension. In one embodiment, for example, the position engine extension 216 may be implemented as one or more BREW-based LPS extensions such as QUALCOMM® ILpsPosDet and/or IGeoservice interfaces. The position engine extension 216 may be arranged to receive location requests from the LBS API handler 214 and may forward location responses to the LBS API handler 214 for delivery to the LBS application 206 through the LBS API 212.

The position engine extension 216 may be arranged to provide client registration and provisioning of privacy settings. The position engine extension 216 also may be arranged to communicate securely over a network with a PDE (e.g., LPS or MPC) arranged to provide authentication and authorization services and/or a variety of geo-services. For example, the position engine extension 216 may be arranged to communicate with a PDE configured to verify privacy for location requests, allow authorized access to a location server, and provide various location server services. The position engine extension 216 also may be arranged to communicate with a PDE to request and receive geo-service information. Examples of geo-service information may include mapping information, routing information, geo-coding and reverse geo-coding information for addresses and coordinates, POI information, and so forth.

The radio processor 104 may comprise or implement a position engine interface 218 such as position engine API and/or one or more position engine libraries. The position engine interface 218 may comprise any suitable API and/or libraries used to generate one or more position fixes using the position engine 220. In one embodiment, for example, the position engine interface 218 may be implemented as a BREW-based API such as a QUALCOMM® TPosDet API.

The position engine interface 218 may be arranged to invoke a position fix by configuring the position engine 220 and requesting a position fix. For example, the position engine interface 218 may set configuration parameters that control the position determination process. Examples of configuration parameters may include, without limitation, position determination mode (e.g., standalone, MS-assisted, MS-based), actual or estimated number of position fixes (e.g., single position fix, series of position fixes, request assisting information without a position fix), time interval between position fixes, Quality of Service (QoS) values, optimization parameters (e.g., optimized for speed, accuracy, or payload), PDE address (e.g., IP address and port number of LPS or MPC), and so forth.

The position engine interface 218 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

The radio processor 104 may comprise or implement a position engine 220 such as GPS engine. In various embodiments, the position engine 220 may be arranged to provide position determination capabilities for the mobile computing device 100. In some embodiments, the position engine 220 may be implemented as software operating in conjunction with hardware (e.g., GPS receiver hardware) allowing the mobile computing device 100 to receive and process GPS satellites signals for position determination. In one embodiment, the position engine 220 may be implemented as a QUALCOMM® gpsOne® engine.

In various implementations, the position engine 220 may employ one or more position determination techniques such as GPS, CGI, CGI+TA, EFLT, TDOA, AOA, AFTL, OTDOA, EOTD, AGPS, GPS/AGPS, hybrid techniques, and so forth. The position engine 220 also may be arranged to operate in one or more position determination modes including a standalone mode, an MS-assisted mode, and an MS-based mode. The determined position information generated and/or obtained by the position engine 220 generally may comprise any type of information associated with the location of the mobile computing device 100. Examples of position information may include, without limitation, current location, latitude, longitude, altitude, heading information, vector information such as horizontal and vertical velocity, sector-based position location, position fix information, position uncertainty, device orientation, and so forth.

In some implementations, determined position information may be cached for a certain period of time for subsequent and/or repeated use by the mobile computing device 100. The cached position information may be stored internally or externally to the host processor 102 and/or the radio processor 104 on one or more types of computer-readable storage media. In such implementations, a check may be made whether previously determined cached position information is valid prior to performing additional position determination processing. If the previously determined cached position information is still valid for the mobile computing device 100, the cached position information may be used by the position engine 220 avoiding the need for additional position determination processing. If the previously determined cached position information is not valid for the mobile computing device 100, the position engine 220 may generate or obtain position information by performing one or more position determination techniques in one or more position determination modes.

As shown in FIG. 3, the radio processor 104 may comprise or implement a data stack 222 including a set of lower layers including a transport layer (e.g., TCP layer), a network layer (e.g., IP layer), and a link layer (e.g., PPP layer). In various embodiments, upper layer programs such as one or more position determination programs may communicate using the data stack 222 through a data socket interface such as a Microsoft® Winsock interface that enables upper layer programs to access network services using the data stack 222.

Although some embodiments may be described with the data stack 210 and the data stack 222 implemented as a TCP/IP/PPP protocol data stacks by way of example, it may be appreciated that the data stack 210 and/or the data stack 222 may comprise or implement other suitable types of transport layers, network layers, and/or link layers in accordance with the described embodiments.

Figure 4:
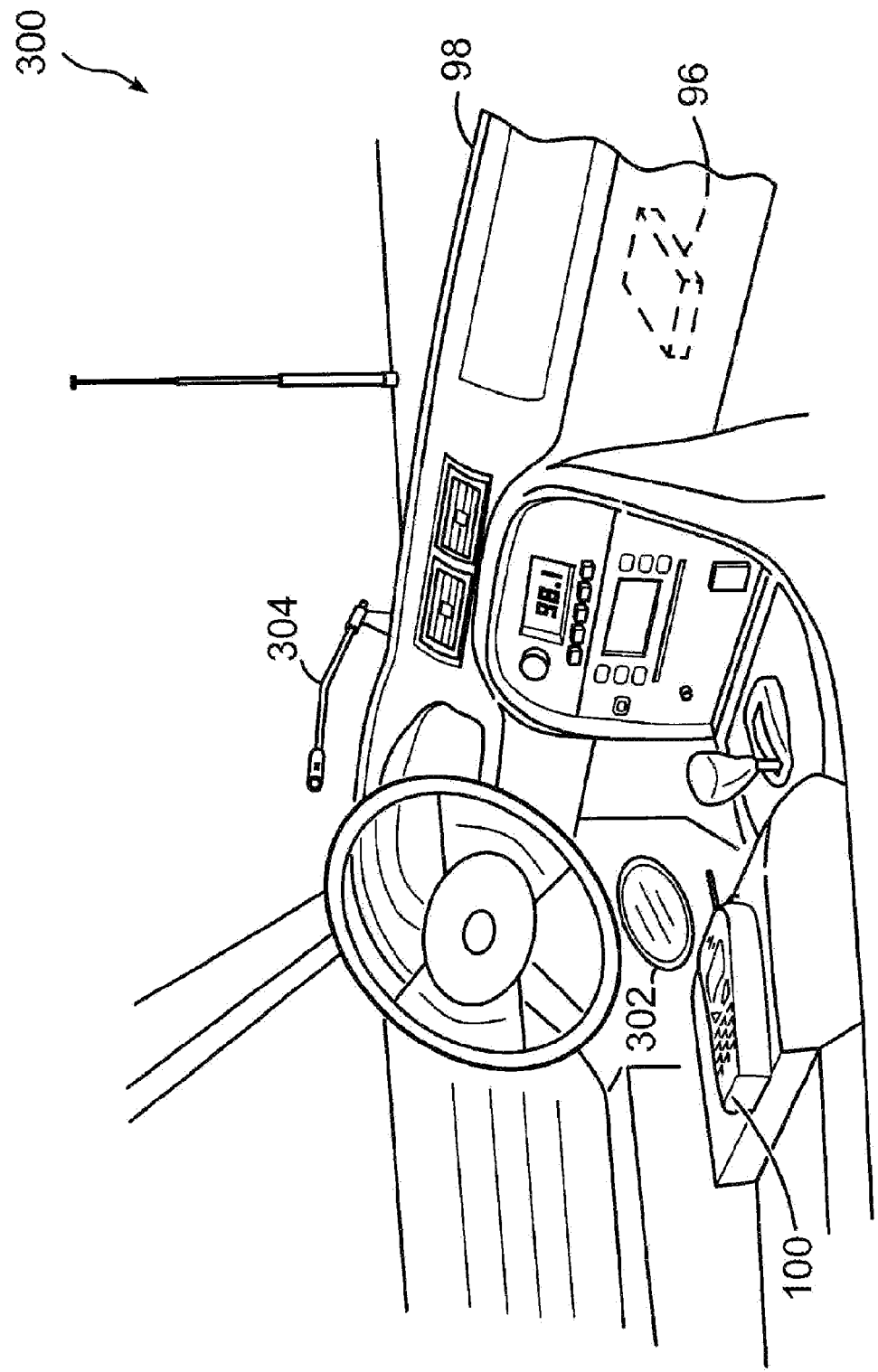
FIG. 4 illustrates a vehicle based communication device in accordance with one or more embodiments of destination tracking.

FIG. 4 illustrates a vehicle 98 based communication device 96 arrangement 300. The vehicle 98 may be an automobile or truck or any vehicle including a bus, a motorcycle, or a boat.

In an embodiment, the vehicle 98 based communication device 96 communicates with the mobile computing device 100. Communication between the vehicle 98 based communication device 96 and the mobile computing device 100 may be by wire, wirelessly, or as desired.

The vehicle 98 based communication device 96 may receive data from the mobile computing device 100 or communicate data to the mobile computing device 100 by way of a short range wireless communication system, such as a wireless personal area network (PAN) system, or as desired. One example of a suitable short range wireless communication system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

In some embodiments, the vehicle 98 based communication device 96 receives audio data from the mobile computing device 100 and provides that audio data to a speaker. The speaker may, for example, be an earphone that is placed in or near the ear of the person using the mobile computing device 100, one or more speakers for use with the vehicle 98 based communication device 96, or one or more speakers 302 built into the vehicle 98 for use with a vehicle 98 audio system.

In some embodiments the vehicle 98 based communication device 96 receives audio data from a user and transmits that data or related data to the mobile computing device 100. For example, voice data may be received by a microphone 304 coupled to the vehicle 98 based communication device 96 from a user. That voice data may be transmitted to the mobile computing device 100 to be forwarded to a caller or voice mail. In various embodiments, the microphone may be coupled to the vehicle 98 based communication device 96 by wire, wirelessly, or as desired for the application.

Voice data may alternately be converted to other data by the vehicle 98 based communication device 96. For example, a contact name may be spoken by the user and received by the vehicle 98 based communication device 96. The vehicle 98 based communication device 96 may reference the contact name to find contact information for the contact, such as a telephone number, and the vehicle 98 based communication device 96 may instruct the mobile computing device 100 to place a call or otherwise contact the contact. In at least one embodiment, contact information, such as contact names, is downloaded into the vehicle 98 based communication device 96 and recognized by the vehicle 98 based communication device 96 when spoken.

Figure 5:
FIG. 5 illustrates a destination database in accordance with one or more embodiments of destination tracking.

FIG. 5 illustrates a sample destination database 400. The sample destination database includes a description of the destination 402, a date of arrival at the destination 404, a time of arrival at the destination 404, a date of departure from the destination 410, a time of departure from the destination 410, a latitude of the destination 412, and a longitude of the destination 414.

The fields of the destination database 400 may be stored as desired. For example, the date and time may be stored as a single field containing a floating point numeral wherein the integer part is representative of the number of days since a base date and the fractional portion represents a portion of a day that has passed representing time of day.

In an embodiment, the destination database 400 is stored on the mobile computing device 100. The destination database may, for example, be stored in the memory 108 or 124 of the mobile computing device 100. Each time the mobile computing device 100 reaches a destination, which may be recognized for example by the mobile computing device 100 loosing communication with the vehicle 98 based communication device 96, the mobile computing device 100 stores an entry in the destination database 400. Each entry may include information about the destination as desired, such as, for example, the date at which the mobile computing device ceased to communicate with the vehicle based communication device; the time at which the mobile computing device ceased to communicate with the vehicle based communication device; and a description of what is situated at the location where the mobile computing device ceased to communicate with the vehicle based communication device. Other information, such as the latitude and longitude of the destination, the date when the mobile computing device 100 next communicated with the vehicle 98 based communication device 96, and the time when the mobile computing device 100 next communicated with the vehicle 98 based communication device 96 may also be stored in the destination database 400.

In an embodiment, the longitude and latitude of the destination may be stored in the destination database and the description of what is situated at that location may be determined subsequently when, for example, the user wishes to review that destination.

In an embodiment where latitude and longitude of a destination are stored, the latitude and longitude may be used where all destinations within a range of latitudes and longitudes are requested to be displayed on the mobile computing device 100 or another device. For example, where a map display is being used, the boundaries of the map may be selected ad those boundaries may be equated to longitudes and latitudes such that all destinations visited within those longitudes and latitudes may be displayed on the map.

Figure 6:
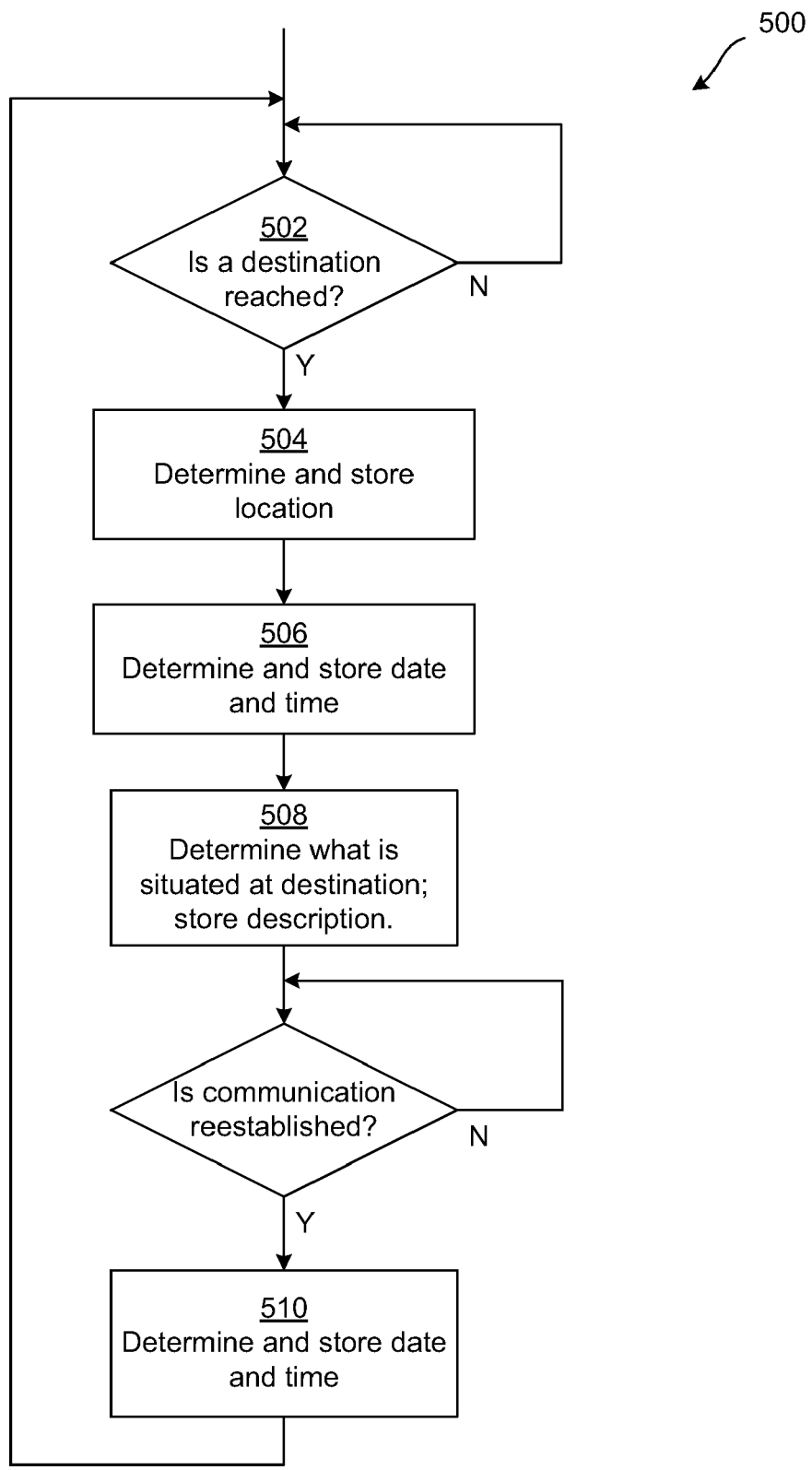
FIG. 6 illustrates a flow diagram in accordance with one or more embodiments of destination tracking.

FIG. 6 illustrates a flow diagram of a method of storing a destination in a database 500. At 502, a determination is made that a destination has been reached. Various apparatuses, including for example, the mobile computing device 100 or the vehicle 98 based communication device 96 may determine that a destination has been reached. The determination that a destination has been reached may furthermore be determined in various ways, including for example, loss of short range wireless communication between the mobile computing device 100 and the vehicle 98 based communication device 96, sensing the cessation of vehicle 98 operation, or removal of a key from the vehicle 98.

At 504, the location of the destination is determined. The determination of the destination location may be performed by the mobile computing device 100 or the vehicle 98 based communication device 96 and may be performed by use of any location-based service. The location may be in the form of a longitude and latitude of the location and may be stored for later reference.

At 506, the date and time at which the destination was reached is determined and stored. The date and time at which the destination was reached may be determined by the mobile computing device 100 or the vehicle 98 based communication device 96 and may be determined, for example, by reference to an internal clock or by request from a mobile communications service.

At 508, a description of what is situated at the destination location is ascertained and stored. As discussed hereinbefore, the description of what is situated at the destination location may be determined in various ways including reference to a map database and the description of the destination location may include various types of descriptions including, for example, a commercial business name or a street address.

At 510, the date and time at which communication between the mobile computing device 100 and the vehicle 98 based communication device 96 next resumed is determined and stored.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary components or modules performing various operations, it can be appreciated that the operations performed by such components or modules may be combined and/or separated for a given implementation and may be performed by a greater number or fewer number of components or modules. It also is to be appreciated that such components or modules may be implemented by one or more hardware components, software components, and/or combination thereof.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

References to "or" are intended as inclusive such that "or" may indicate one or another of the ored terms or more than one ored term.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a mobile computing device communicating by way of a short range wireless communication system and;
a vehicle based communication device communicating with the mobile computing device by way of the short range wireless communication system, the mobile computing device or the vehicle based communication device establishing a location-based service (LBS) communications session and storing a description of a location associated with a destination when the mobile computing device and the vehicle based communication device reach the destination, wherein the description is provided to a messaging application on the mobile computing device.

2. The apparatus of claim 1, wherein the description of the location is stored in a destination database.

3. The apparatus of claim 2, wherein the destination database is stored in memory of the mobile computing device.

4. The apparatus of claim 1, wherein the LBS communications session comprises a global positioning system (GPS) communications session.

5. The apparatus of claim 1, wherein the LBS communications session comprises a cell global identity technique.

6. The apparatus of claim 1, wherein the location-based services (LBS) communications session is performed by the mobile computing device.

7. The apparatus of claim 1, wherein the mobile computing device and the vehicle based communication device have reached the destination when the mobile computing device and the vehicle based communication device cease communicating on the short range wireless communication system.

8. The apparatus of claim 1, wherein the mobile computing device and the vehicle based communication device have reached the destination when a key is removed from an ignition of the vehicle.

9. The apparatus of claim 1, wherein at least one of the mobile computing device and the vehicle based communication device stores a time when the mobile computing device and the vehicle based communication device reach the destination.

10. The apparatus of claim 1, wherein at least one of the mobile computing device and the vehicle based communication device stores a date when the mobile computing device and the vehicle based communication device reach the destination.

11. The apparatus of claim 1, wherein at least one of the mobile computing device and the vehicle based communication device stores the location when the mobile computing device and the vehicle based communication device reach the destination.

12. The apparatus of claim 1, wherein at least one of the mobile computing device and the vehicle based communication device stores a time when the mobile computing device and the vehicle based communication device leave the destination.

13. The apparatus of claim 12, wherein the mobile computing device and the vehicle based communication device leave the destination when the mobile computing device and the vehicle based communication device begin communicating on the short range wireless communication system after the mobile computing device and the vehicle based communication previously ceased communicating on the short range wireless communication system.

14. The apparatus of claim 12, wherein at least one of the mobile computing device and the vehicle based communication device stores a time when the mobile computing device and the vehicle based communication device leave the destination.

15. The apparatus of claim 1, further comprising the mobile computing device displaying the description of the location.

16. The apparatus of claim 9, further comprising the mobile computing device displaying the time when the mobile computing device and the vehicle based communication device reach the destination.

* * * * *